United States Patent [19]

Palmieri et al.

[11] 4,195,408
[45] Apr. 1, 1980

[54] CONVERTIBLE, AUTOMATIC TO MANUAL, NYLON LINE VEGETATION CUTTER

[76] Inventors: Vincent Palmieri; John P. Palmieri, both of 3745 El Camino Dr., San Bernardino, Calif. 92410

[21] Appl. No.: 16,562

[22] Filed: Mar. 1, 1979

[51] Int. Cl.² ............................................. A01G 3/06
[52] U.S. Cl. ..................................... 30/276; 56/12.7
[58] Field of Search .................... 56/12.7; 30/276, 347

[56] References Cited
U.S. PATENT DOCUMENTS

| | | | |
|---|---|---|---|
| 3,708,967 | 1/1973 | Geist et al. | 56/12.7 |
| 4,020,552 | 5/1977 | Mizuno et al. | 30/276 |
| 4,024,635 | 5/1977 | Mizuno et al. | 30/276 |
| 4,095,338 | 6/1978 | Naohiko et al. | 30/276 |
| 4,104,796 | 8/1978 | Sheldon | 30/276 |
| 4,134,204 | 1/1979 | Perdue | 30/276 |

Primary Examiner—Jimmy C. Peters
Attorney, Agent, or Firm—Dana E. Keech

[57] ABSTRACT

A line supply spool rotatably confined co-axially within a thin housing shell having a splined mounting on a polygonal arbor through which said housing shell is supported at the lower end of a manually held engine powered handle while the shell is being spun at a high speed on a vertical axis. Free line ends are progressively fed peripherally from the spool through equally spaced windows provided in the housing shell by controlled rotation of the spool relative to the housing shell, the control of the rotation of the spool being optionally effected manually while the tool is shut down or automatically while the tool is spinning, the election being made by a minor selective shifting of a few parts, this election being readily reversed, whenever desired.

2 Claims, 21 Drawing Figures

CONVERTIBLE, AUTOMATIC TO MANUAL, NYLON LINE VEGETATION CUTTER

PRIOR ART

Engine powered manually supported handle means for mounting a fast spinning nylon line vegetation cutter head are well represented in the prior art as are also means of various kinds for supplementing the length of the cutting line ends as these become worn down by use. Some function while the vegetation cutting head is spinning at its normal operating speed, and without the tool being released from the operator's hands. Other more simple devices require that operation of the tool be halted and dependence made on manual manipulation of the cutting line supply spool, mounted in the cutter head housing, to restore to the worn down vegetation cutting lines their most effective operating lengths.

SUMMARY OF THE INVENTION

The present invention is an improvement upon the automatic ROTARY NYLON LINE VEGETATION CUTTER disclosed and claimed in our co-pending application for U.S. Pat. Ser. No. 925,045 filed July 17, 1978, and the present application is a continuation in part of said previously filed case.

Having for many years merchandised and serviced competing types of equipment produced the world over in this particular art, applicants have noted the intense competition there prevailing, and that this is keenly price conscious. Customers able to buy high quality equipment prefer the automatic line replenishing mechanism. The economy minded favor the simple vegetation cutter, the operation of which must be halted to allow manually replenishing full length nylon vegetation cutting lines on the device.

It is thus a prime object of the present invention to provide a basic design for an automatic rotary nylon line vegetation cutter a major portion of the parts of which are optionally adapted for assembly to provide a substantially less expensive nylon line vegetation cutter which reuires halting the device to replenish to their full length the vegetation cutting lines of the tool.

DETAILED DESCRIPTION OF THE PREFERRED EMBODIMENT

Figures 1, 2:
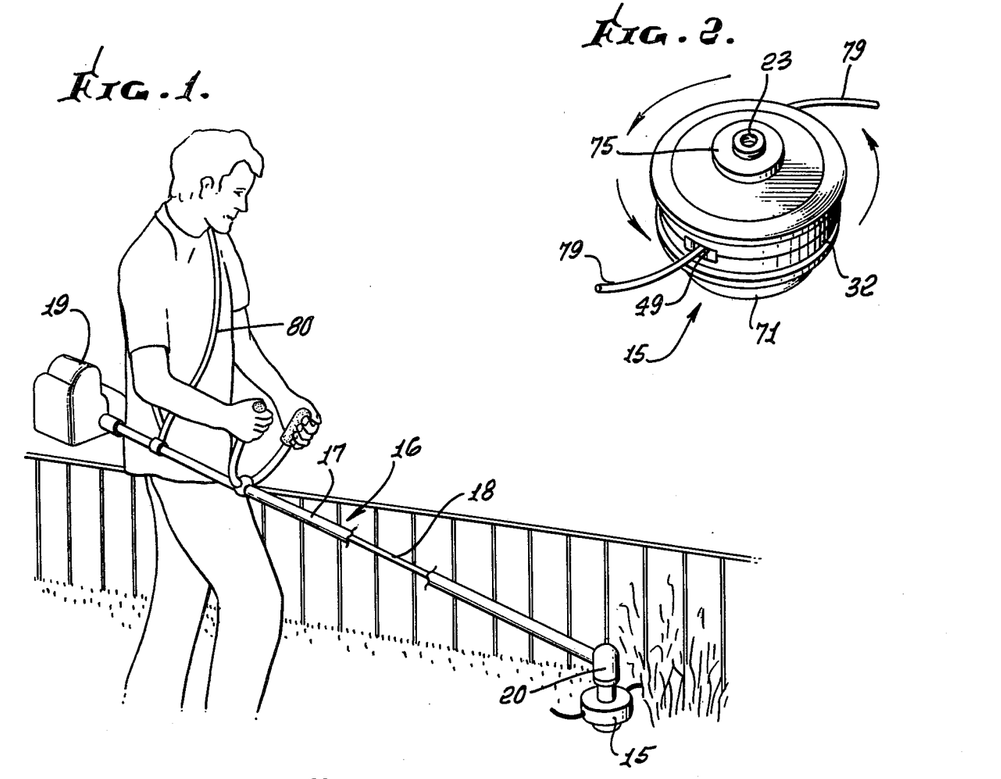
FIG. 1 is a diagrammatic perspective view illustrating a preferred embodiment of the invention in actual use in trimming vegetation at the edge of a lawn. The appearance of the invention here presented is identical regardless of which option is elected in assembling the same, e.i. whether it is assembled, on the one hand, for automatically replenishing the length of the peripheral vegetation cutting lines without halting the high speed rotation of the cutting head, or, on the other hand, so as to require halting such rotation and then manually replenishing said lines.
FIG. 2 is an enlarged perspective view of the rotary cutter head of the invention separated from the operating handle and engine shown in FIG. 1.

While the rotary line cutter head 15 of the invention shown in FIGS. 2, 3, 4, 5 and 6 of the drawings is adapted for reception upon the lower drive ends of most of the large size models of handle mounted power assemblies commonly marketed for nylon line vegetation trimmers, it is preferably associated with the gasoline engine powered handle assemble 16 shown in FIG. 1.

The straight tubular handle 17 of said assembly encloses a shaft 18 connecting an engine 19, mounted on the handles' upper end to a knuckle 20 at its lower end for making an angular drive connection between the shaft 18 and a vertical threaded driving screw 21 which the upper end of the hexagonal arbor 22 of head 15 has a tapped hole 23 to receive.

Figure 3:
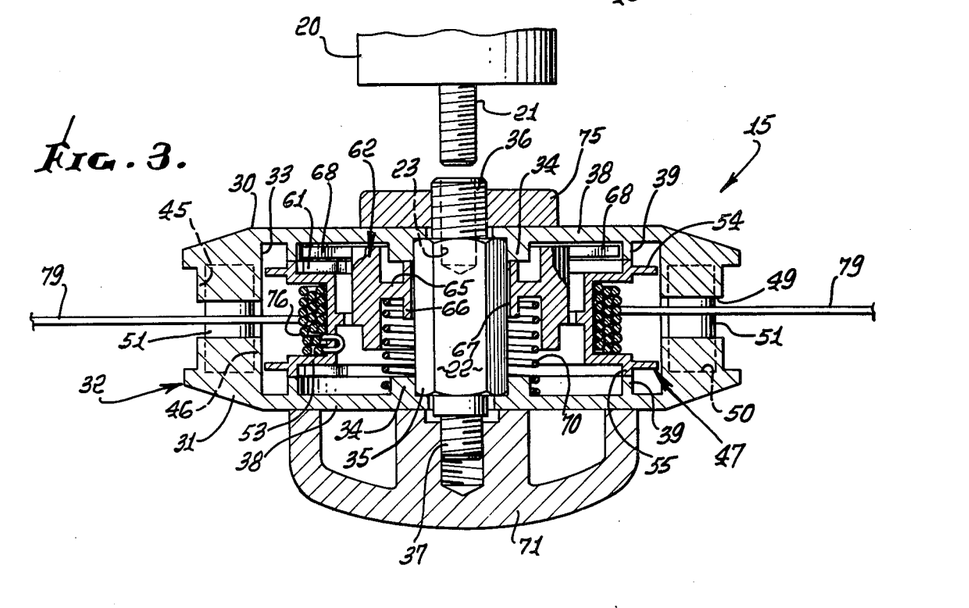
FIG. 3 is an enlarged (full scale) vertical sectional view taken through the line emitting windows of the cutter head housing and showing the invention assembled pursuant to the election to embody therein an inertia responsive indexer which automatically restores proper lengths to the vegetation cutting lines of the device, without halting the spinning of the cutter head housing.
Figure 4:
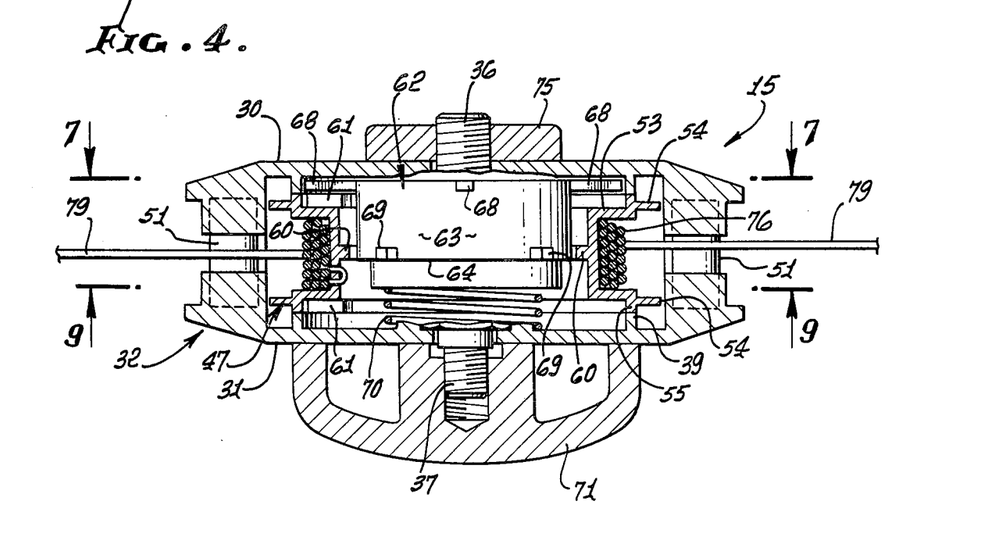
FIG. 4 is a view similar to FIG. 3 excepting for the indexer being here shown in elevation instead of in section.
Figure 5:
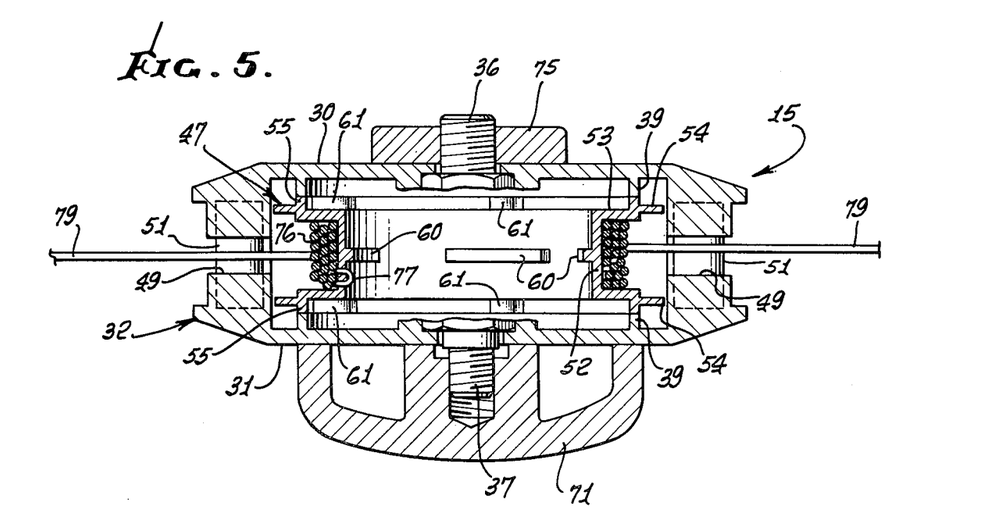
FIG. 5 is a view similar to FIG. 4 excepting for its showing the indexer removed and the arbor and shell hubs broken away to more clearly illustrate the internal structure of the spool of the invention.

Referring now to FIGS. 3, 4 and 5, the drive head 15 is seen to include upper and lower housing halves 30 and 31 which are identical so as to be united by arbor 22 to form rotary cutter head housing 32 enclosing a flat cylindrical chamber 33 and presenting hex apertured shallow hubs 34 to the main hex body 35 of arbor 22. Upper and lower extremities of arbor 22 are turned down to penetrate the central apertures of housing halves 30 and 31 as shown and provided with external threads 36 and 37.

The housing 32 has upper and lower peripherally tapered horizontal outside walls 38 inwardly from which are molded annular spool bearing tracks 39.

The inside diameter of the housing chamber 33 is formed by the inner of two concentric peripheral walls, outer wall 45 and inner wall 46, and the latter just provides adequate room for free rotation within chamber 33 of vegetation cutting line magazine spool 47.

The outer and inner peripheral walls 45 and 46 of upper and lower housing halves abut face-to-face in the housing medial plane and certain diametrically opposed portions of said halves are partially filled in solid and provided with like opposed inner edge notches 48 which match to form two line escape windows 49. Vertically aligned closely spaced ⅛" roller bearing cups 50 are molded in the partly filled in portions of walls 45 and 46 to rotatably trap pairs of rollers 51 spaced apart about one-eighth of an inch and located symmetrically with the longitudinal diametral axial plane of said line escape windows 49.

Between the opposite areas of outer and inner peripheral walls 45 and 46 where the line escape windows 49 are formed, these walls are left quite thin for weight reduction purposes. Plastic material is preferred in making housing halves 30 and 31 as well as the spool 47.

The latter element, as can be seen in FIG. 5, is molded so as to be symmetrical about the medial plane at which the housing halves 30 and 31 abut. It is of course also freely rotatable co-axially with respect to the housing 32 within the limits imposed by the controls provided by the invention.

Being symmetrical about its interfacial axial plane, spool 47 will function just the same no matter which end is turned up in the assembly of the invention.

A similar facility in assembling and repairing the invention is served by the identity of the upper and lower housing halves 30 and 31.

The spool 47 has a thin-walled cylindrical hub 52, the inside bore of which is about three times its axial length and has like outwardly peripherally beaded flat radial flanges 53 which are extended into close rotational relation with inner housing peripheral walls 46 by very thin radial peripheral spool flanges 54.

It is to be noted that the square cross sectioned annular beads 55 on flanges 54 extend axially outwardly into matching bearing relation with housing spool positioning tracks 39.

Referring now to FIGS. 5, 7, 16, 17 and 18, it is noted that spool 47 has molded thereon to extend radially inwardly from the bore of cylindrical hub 52, symmetric with the medial horizontal plane of symmetry of spool 47, four square edged stops 60, each 50° in length, these stops being uniformly spaced apart 40° so as to be spaced apart 90° on centers. Filling in the space overlying and underlying the outwardly beaded radial peripheral spool flanges 53 and exactly circumferentially oriented with the medial stops 60 in the bore of hub 52, are four upper and four lower radial stops 61.

Non-rotatably slideable vertically on the hex body 35 of arbor 22 within the spaces in chamber 33 not occupied by spool 47 is an indexer 62. This element is preferably formed of metal and is designed to be die cast. It thus comprises a unitary annular metal body 63 having a decreased outer diameter at its lower end to provide an annular outer shoulder 64 about one-third of the way from its bottom end. Midway between its opposite ends an internal metal web 65 integrally unites the annular body 63 with a thin walled short hub 66 having a hex shaped aperture 67 slideably receiving the hex body 35 of arbor 22 so as to slide freely on said arbor while being held at all times non-rotatable thereon.

Figures 7, 8:
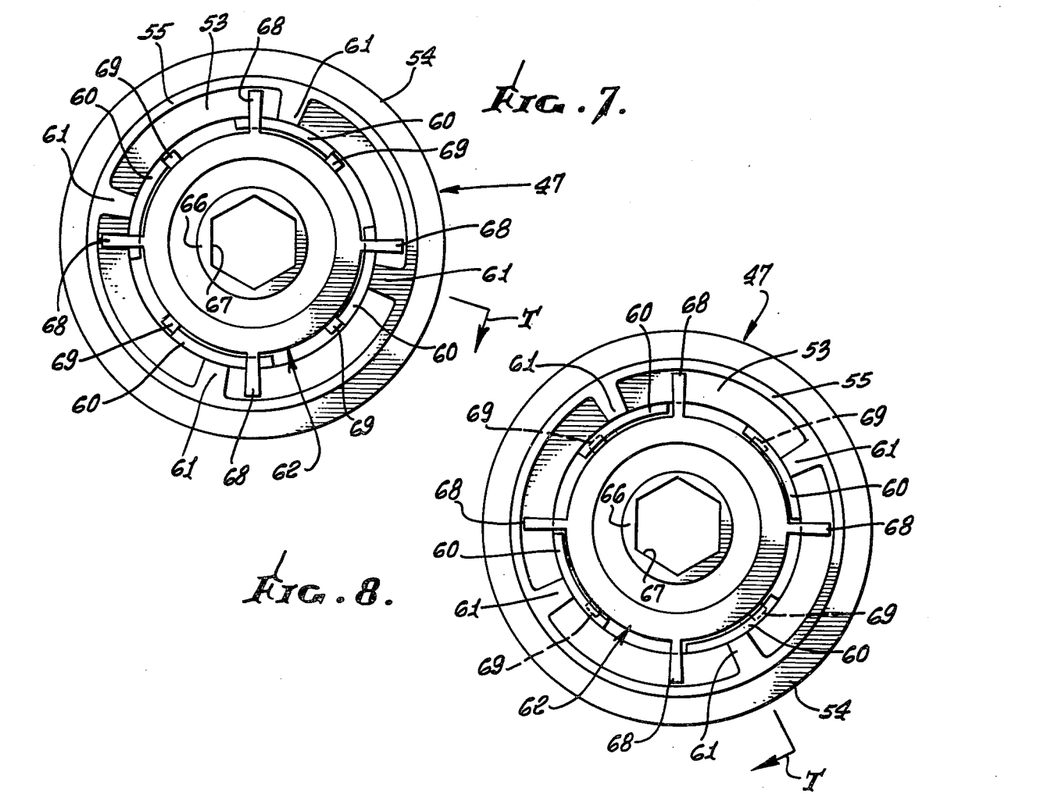
FIGS. 7, 8, 10 and 11 are successive full scale horizontal plan diagrams taken on the line 7—7 of FIG. 4 of the relative positions assumed by the spool and the indexer of the invention as a result of the bumping of the device as shown in FIG. 6.
Figures 9, 10, 11, 12:
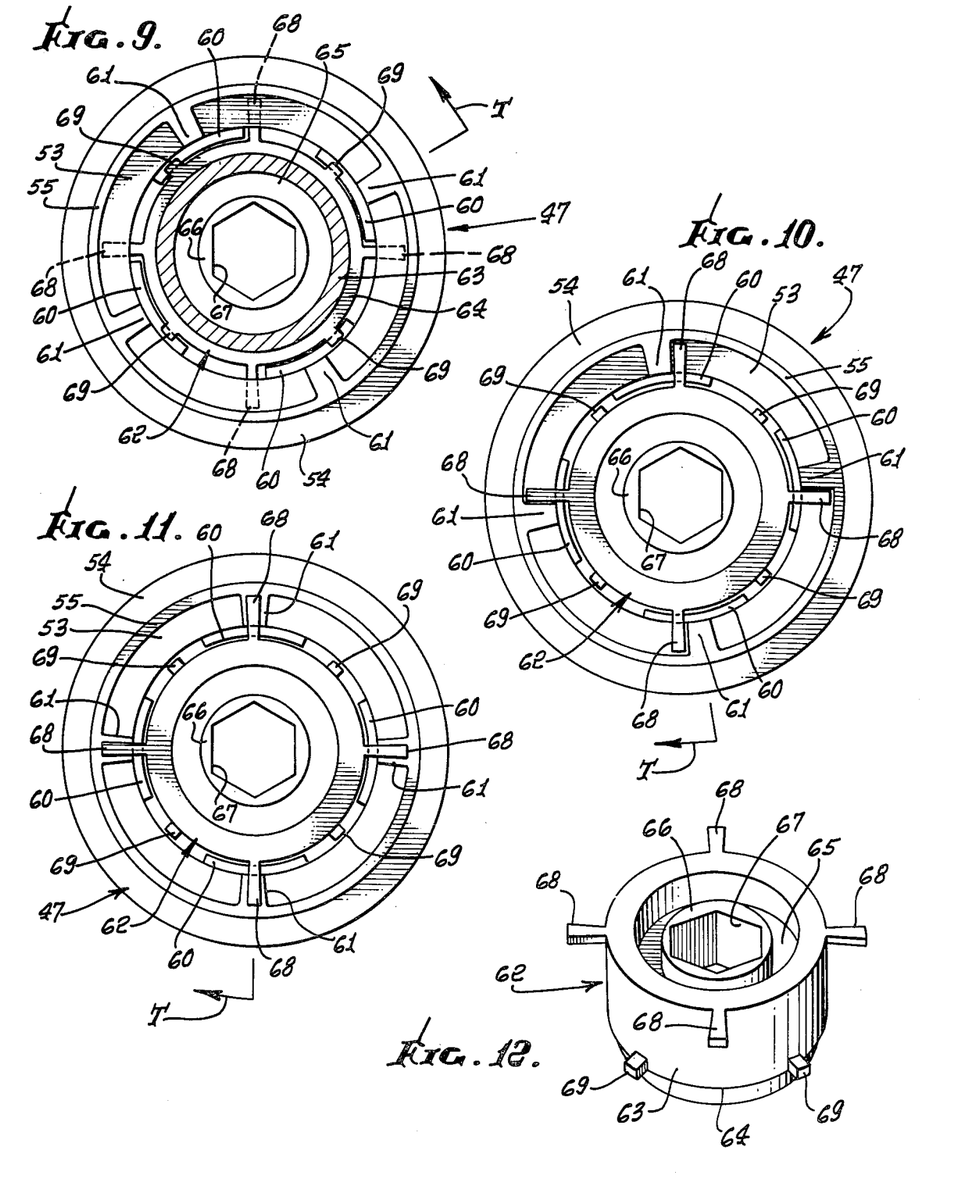
FIG. 9 is a full scale horizontal bottom plan diagram taken on the line 9—9 of FIG. 4 of said spool and indexer and illustrating one of the steps of a line indexing operation.
FIG. 12 is a diagrammatic perspective view of the indexer of the invention.
Figure 13:
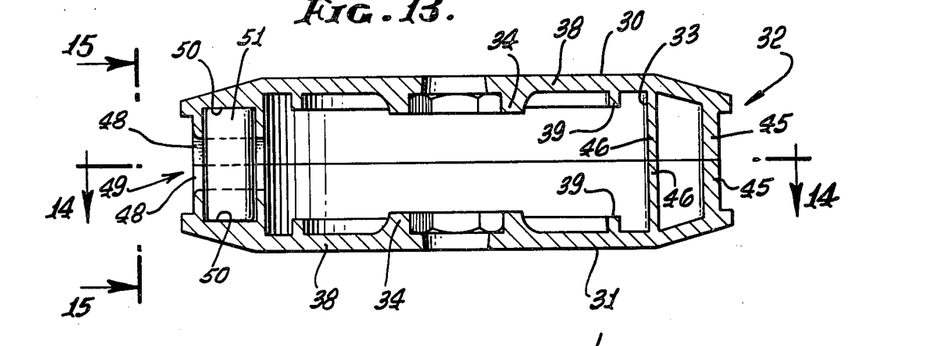
FIG. 13 is a vertical axial cross sectional view of the rotary cutter head housing of the invention which comprises two identical housing halves secured in face-to-face abutment with each other, this view being taken on line 13—13 of FIG. 14.
Figure 14:
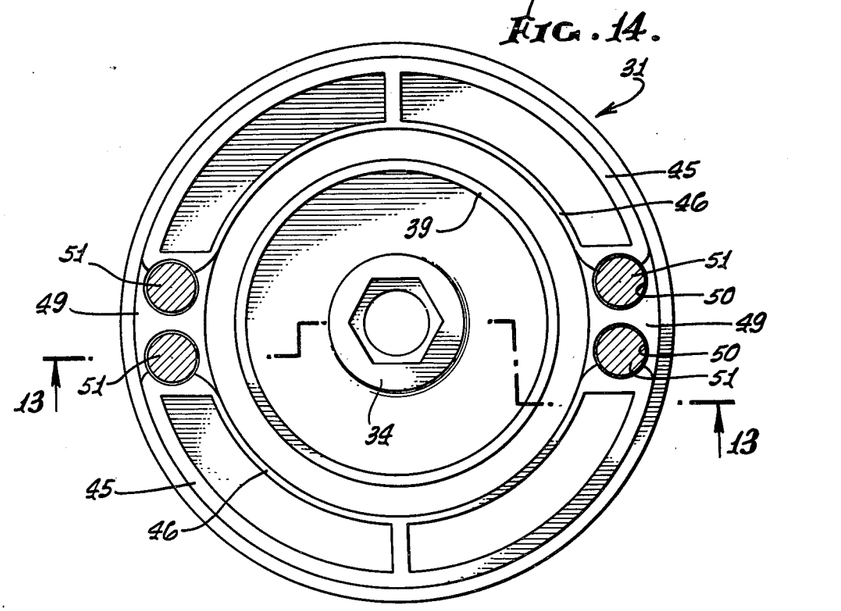
FIG. 14 is a horizontal cross sectional view of FIG. 13 taken on the line 14—14 thereof.
Figure 15:
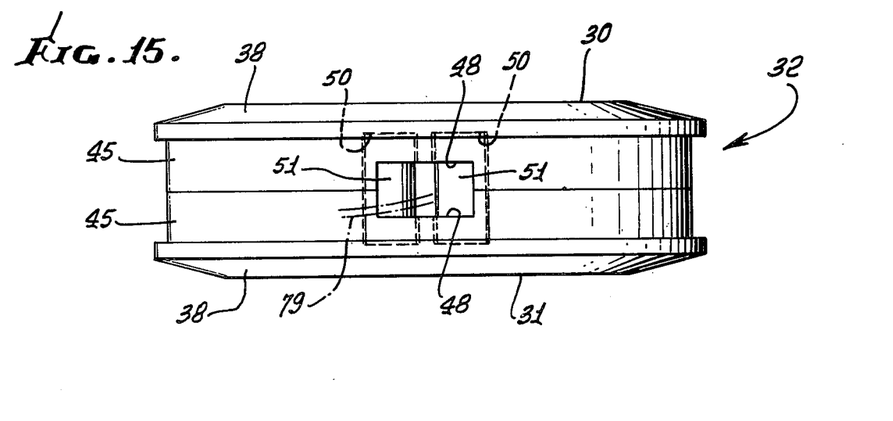
FIG. 15 is a side elevational view taken on the line 15—15 of FIG. 13.
Figure 16:
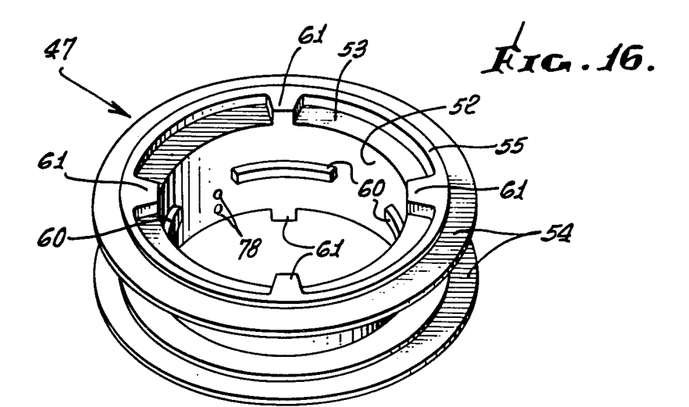
FIG. 16 is a diagrammatic perspective view of the reserve nylon line carrying spool of the invention.
Figure 17:
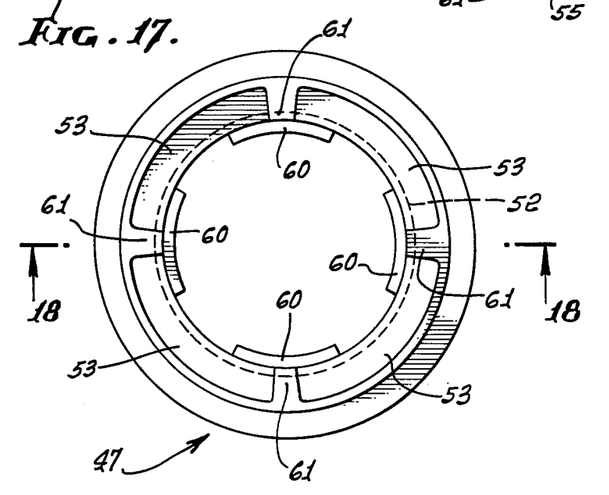
FIG. 17 is a plan view of said spool.
Figure 18:
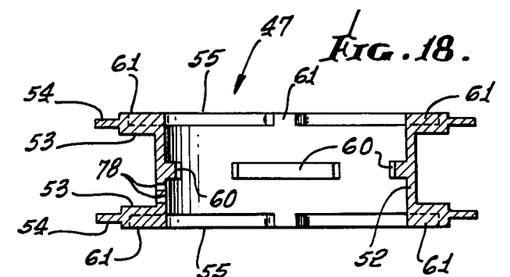
FIG. 18 is a cross sectional view of said spool taken on the line 18—18 of FIG. 17.

Referring now to FIGS. 4, 7 and 12, it is to be noted that annular indexer body 63 has four narrow and relatively long lugs 68 formed integral with the body at its upper end and extending radially therefrom at 90° intervals. Just above the level of shoulder 64, four short lugs 69 are formed integral with body 63 and extend radially therefrom at 90° intervals with each other but 45° out of phase with long lugs 68.

Figure 6:
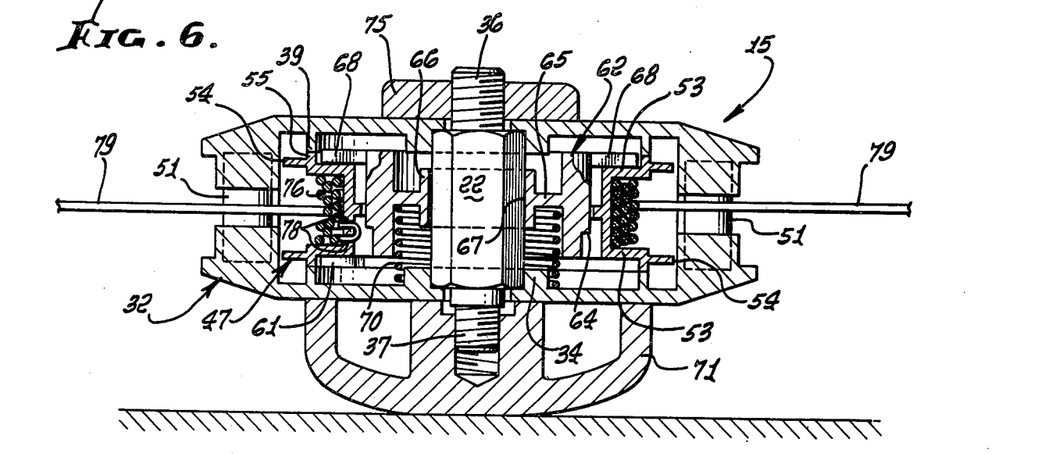
FIG. 6 is a vertical sectional view similar to that of FIG. 3 excepting for the fact that it illustrates the moment the rotary head of the invention is subjected by the operator as shown in FIG. 1, to a resouding bump on the lawn or ground therebeneath. This initiates a line feeding step of the invention by utilizing the inertia of the indexer to shift it from its top position in the structure of the invention (shown in FIGS. 3 and 4) to its lowermost position therein (shown in FIG. 6).

Referring now to FIGS. 3 and 6, it is noted that in assembling the rotary head 15, a light coil spring 70 is inserted over the lower hex apertured hub 34, and the indexer 62 is lowered on the arbor 22 and spring 70 as shown in FIG. 3.

Putting together FIG. 3, FIG. 4 and FIG. 7, it will be clear that the assembly shown in these views could not have been effected unless the spool 47 had been turned to place the medial plane spool stops 60 out of vertical registry with short indexer lugs 69. FIG. 7 shows the required non-axial-registry of stops 60 with lugs 69 so that the lugs 69 vertically by-pass the stops 60 as shown in FIGS. 3, 4 and 6, permitting upper and lower housing halves 30 and 31 to be brought into face-to-face abutment and the fastening means applied to consummate the assembly.

These means include screwing a polyurethane molded bounce button 71 on the lower external threads 37 of arbor 22 and screwing a nut 75 on the upper external threads 36 of said arbor.

Wound clockwise on the spool 47 before it is assembled within the rotary cutter head 15 is a doubled length of solid nylon line 76. The bight 77 at the inner turn of this doubled length of line is anchored to the spool by threading the two half lengths of the line through a closely spaced pair of holes 78 provided at a convenient spot in the hub 52 of the spool (see FIGS. 3, 4, 5 and 6). After the double line is then wound in a common direction on the spool, the respective end portions 79 of the line 76 are fed outwardly through the windows 49 to provide the required vegetation cutting elements when the tool is operated as shown in FIG. 1.

OPERATION

When the rotary cutter head 15 is assembled as above desribed, it is united with the engine powered handle assembly 16 by screwing the vertical power output screw 21 into the tapped bore 23 in the upper end of the arbor 22, thereby rotatably suspending the cutter head on said powered handle assembly.

To operate the device for cutting vegetation as in trimming the edge of a lawn (see FIG. 1) it is merely necessary for the operator to put on the power assembly supporting harness 80, start the engine 19 and rev this up to near top speed while manipulating the tool into engagement with vegetation to be cut as illustrated in this view.

It is common practice to rotate nylon line cutting heads in excess of 6000 rpm. The present invention is designed to follow this practice and to replenish the extending line end portions 79 as they wear down without interrupting the rotation of the cutter head. It is also designed to automatically regulate its functions in this respect to prevent end portions 79 exceeding eight inches in length being fed from the cutter head 15. These objects are attained by the following mode of operation illustrated in FIGS. 3 through 11 reference to which will now be made.

FIG. 7 illustrates in a true scale plan diagram, the rotational relationship between spool 47 and indexer 62 with particular respect to the vis a vis relationship existing between the spool stops 60 and 61 on the one hand, and the indexer lugs 69 and 68, on the other, respectively, when the indexer 62 is spring biased into its uppermost operation position shown in FIGS. 3 and 4.

During the continuance of the situation thus illustrated, no clockwise rotation of spool 47 relative to indexer 62 and thus no feeding of fresh line increments from the windows 49 can take place because of the four short lugs 69 extending axially into radially interlocking relation (you might say "splined" relation) with the medial plane spool stops 60.

The initial length of the freely extending cutter line end portions 79 is determined by the manual rotation of the spool 47 before inserting the indexer 62 into the head 15 and at the time the free ends of the double stranded nylon line are respectively being manually withdrawn from spool 47 through line escape windows 49 in the cutter head housing 32.

Whatever the starting length of cutter line end portions 79 may be, the centrifugal forces applied by such line end portions to the double strand turns of nylon line 76 wound on spool 47 which is of course transmitted to the spool, to which the inner bight 77 of the line is attached, places the spool 47 under a constant clockwise torque. This torque is an essential factor in the functioning of the invention, as will now be described in detail.

FIG. 7 shows this torque in action biasing the medial spool stops 60 against the short indexer lugs 69.

The clockwise torque constantly imposed on spool 47 by the centrifugal force generated in free whirling line end portions 79 is indicated by arrows T in FIGS. 7-11 inclusive.

It is to be further noted that upper spool stops 61 and upper indexer lugs 68 have truely radial side edges whereby rotation of spool 47 relative to indexer 62 is interrupted by frictional abutment over wide areas between the four radially long and narrow indexer lugs 68 and the upper four radially long and not-so-narrow spool stops 61 which substantially inhibits vertical translation of indexer 62 on arbor 22 to set the stage for a bumping operation designed to generate a measured feeding of additional line 76 to extend the length of line end portions 79. This inhibition varies with the value of the centrifugal force being created by high speed rotation of cutter head 15 and is a function of the length, at any existing moment, of the free whirling line end portions 79.

The opposed areas of the four radially short spool stops 60 and the four radially short index lugs 69 offer a relatively minor frictional opposition to the translation of indexer 62 from its upper position shown in FIGS. 3 and 4 to its lower position shown in FIG. 6 when the existing line end portions 79 are fairly short.

Assuming this to be the case when the initial bumping of the cutter head 15 is undertaken, for the purpose of supplementing the length of line portions 79, we note in FIG. 6 the resulting downward translation of indexer 62 lowering lugs 69 out of horizontal alignment with medial spool stops 60 thus freeing the spool for clockwise rotation in response to the torque T while simultaneously shifting the four indexer upper long lugs 68 downward into a frictional sliding position resting on the upper radial peripherally beaded spool flange 53 and in horizontal alignment with the four upper spool stops 61 whereby the clockwise torque constantly being applied to spool 47 spins this to whip the four upper spool stops 61 into snug frictional engagement with the four long indexer lugs 68 as shown in FIG. 10.

An intermediate step in this 66° line-increment-feeding clockwise-turning movement of the spool 47 is shown in plan in FIG. 8 and in bottom plan in FIG. 9.

Assuming the reserve body of line 76 wound on spool 47 has an OD of 3", line increments 1.73" in length are fed from head 15 to each of the line end portions 79 in the bumping operation just described.

An important characteristic of the invention resides in the fact that when the increments just fed to supplement the length of line end portions 79, extends these as much as eight inches from the cutter head 15, the centrifugally produced torque T being at that moment applied to spool 47 locks the indexer 62 against axial translation by inertia force set up by another attempted manual ground bumping operation. This fact inhibits an operator from mistakenly feeding exccessive amounts of line 76 from head 15 which would require line end portions 79 to be manually trimmed in order for head 15 to function satisfactorily. An economical use of line 76 is thus assured without special skill being required by the operator.

The head 15 is designed to remain thus locked, as shown in FIG. 10, against further line increment feeding, until said portions 79 have been worn down by use to lengths of approximately five inches or less.

When the latter circumstance has occurred, the resulting reduction in the torque T applied to spool 47 releases the frictional grip of the spool on indexer 62 allowing spring 70 to return the indexer to its uppermost position shown in FIGS. 3 and 4 which allows spool 47 to turn clockwise to its position shown in FIG. 7 thus completing a cycle of 90° and, incidental thereto, feeding supplemental line increments of 0.83" in length to the line end portions 79.

These split phase line increment feeding functions of the rotary line vegetation cutter head 15 must be understood as normally occurring entirely during the unremitting turning of said head and do not require more than a few seconds spent in the bumping function to restore line end portions 79 to proper operating lengths. In fact, the holding of the tool in the hands while performing a vegetation trimming job may continue unchanged while bumping the rotating rotary head 15 in restoring, to fully operative lengths, the line end portions 79.

Whereas, the control of the indexer 62 may be effectively accomplished by a succession of bumping cycles described above, an alternate mode of operation for achieving the same end is available by employing a relatively light coiled spring 70 which allows the desired translation of the indexer on the arbor 22 to be produced by merely briskly shaking the handle assembly 16 without contacting the ground in any way with the rotary head 15. Use of the term "bumping" in the claims therefore is to be broadly construed to cover not only this preferred mode of operation of the invention but any equivalent mode of applying inertia to the indexer 62 as by simply shaking the device while it is running and beng wholely supported in the operator's hands.

While the rotary cutting head 15 is shown and described herein as rotating counter clockwise and the reserve line carrying spool 47 is shown and described as rotating clockwise with reference to the head 15 when functioning to supplement the length of line free end cuttingg portions 79, yet the unique design of the invention adapts it to be used in association with various motor or engine powered assemblies 16 some of which provide right hand threads on the head supporting and rotating screw 21 while others provide said screw with left hand threads. Arbors 22 are thus provided optionally with right or left hand internal threads in the tapped hole 23 in its upper end.

The head 15 will of course turn clockwise when driven by a right hand threaded drive screw 21 and counter clockwise when driven by a left hand threaded screw 21. The connection of the head 15 with the screw 21 will thereby always be firmed up by the drive torque transmitted through the screw.

The external threads 36 and 37 on the upper and lower ends of arbor 22 are preferably right hand threads regardless of the direction head 15 rotates.

It is immaterial which direction the spool 47 rotates relative to the head 15 because in any event, the reserve line wound on the spool is always being pulled outwardly therefrom centrifugally with each feeding cycle. This feeding is assured by the fact that no matter how the doubled reserve line is wound upon the spool with the end portions 79 extending out through the housing windows 49, the centrifugal force generated in said free end portions of cutting line will turn the spool in whatever direction the line is wound. Due to the interfacial symmetry inherent in the design of spool 47 and the circumferential symmetry of the stops 60 and 61 in said spool, the latter may have the doubled reserve line 76 wound in either direction tangentially from its bight 77 and then the spool can be mounted in the head 15 with either end up, while withdrawing the free ends 79 through the opposed windows 49, and the invention will operate exactly the same described herein.

Figure 19:
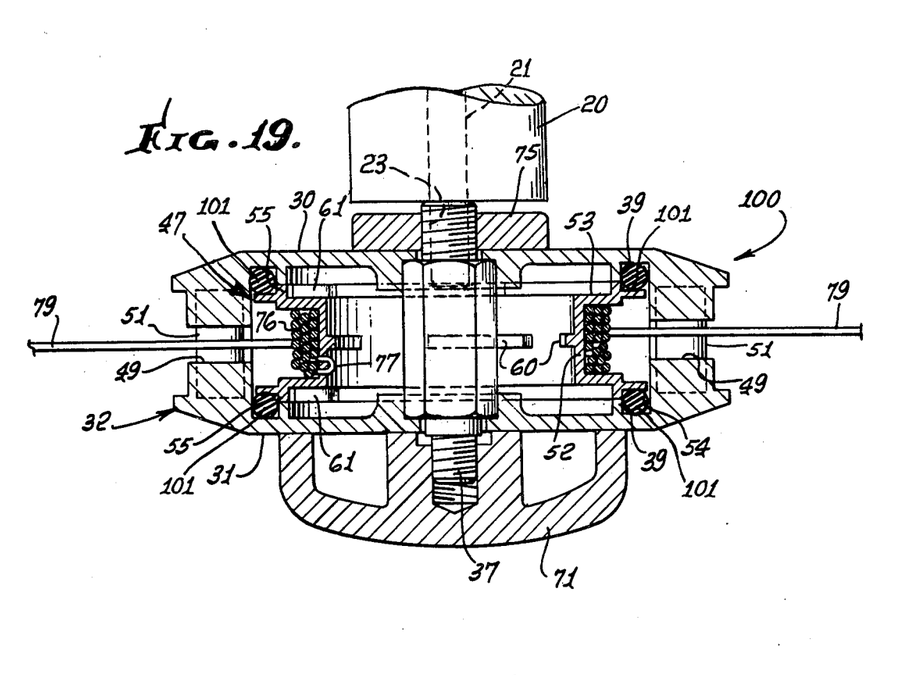
FIG. 19 is a view similar to FIG. 3 showing the rotary cutter head screwed onto the axial drive pin as when being spun in a vegetation cutting operation after the option has been exercised of omitting the indexer and biasing spring from the cutter head and substituting therefor an O-ring spool packing means, thus converting the rotary cutter head from an automatically cutting line feeding head to a manually cutting line feeding head, the latter requiring halting of the head and unscrewing the bumper cap to release the spool and thus allow withdrawal of the desired increments of line through the housing windows, following which, operation of the device may be resumed after tightening the bumper cap to again lock the line supply spool to the housing shell.
Figure 20:
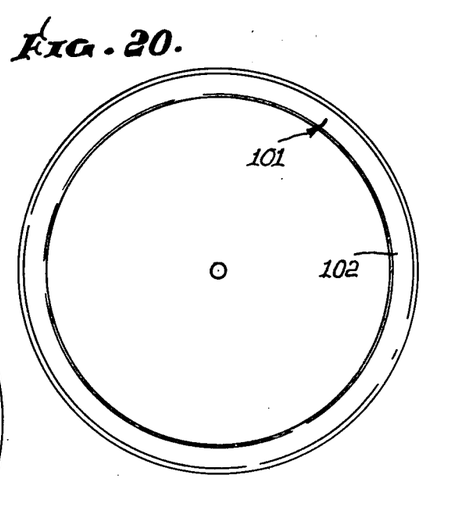
FIG. 20 is a plan view of the preferred form of the spool packing means of the invention.
Figure 21:
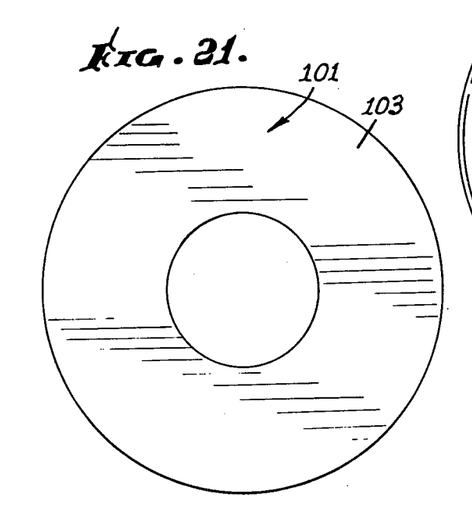
FIG. 21 is a plan view of a modified form of the said spool packing means.

Referring now to FIGS. 19—21 an alternative form 100 of nylon line vegetation cutter is therein illustrated which is evolved from the automatic nylon line vegetation cutter 15 of the present invention hereinabove described, by simply omitting from the latter the indexer 62 and coil spring 70, and inserting an annular packing 101 between at least one of the peripheral thin flanges 54 of line supply spool 47 and a peripheral portion of the flat housing end wall 38 enclosing said thin spool flange 54.

The annular packing 101 preferably comprises at least one O-ring 102. While two such packing annuli 102 are shown in FIG. 19, a single such annulus will normally provide adequate braking capacity to prevent unwanted rotation of spool 47 relative to housing shell 32.

The mode of operation of the vegetation cutter 100, therefore is to depend entirely, for adjusting the lengths of the free cutting lines 79, on manually pulling these lines radially from the line emitting housing windows 49 after spool 47 has been temporarily released from packing 101 by unscrewing bounce button 71 just enough to accomplish this purpose. This manual adjustment can only be made with cutter 100 while the cutter head is shut down. Such replenishing of the length of cutting lines 79 is generally not required more often than once each half hour of lawn edging and the shut down period consumed in the line adjustment is quite nominal.

For economically minded prospective purchasers of lawn trimmers therefor, the trimmer 100 has a strong appeal.

A less expensive packing annulus 103 is shown in FIG. 21 which comprises a very thin soft plastic sheet gasket, the outer periphery of which fits neatly within the chamber 33 of housing 32 and interlies the bottom or upper track 39 of said housing and the corresponding bottom or upper spool track 55.

Manufacturers and dealers will find the present invention of great help in spreading the tooling costs for producing trimmers of two distinct price classes and dealers will greatly appreciate the many parts common to said trimmers, thus cutting down inventory burdens.

We claim:

1. In a flexible-line-whirling vegetation cutting hand tool, a rotary head for which is provided to be supported on and manipulated by a relatively long handle, equipped with power means for rapidly spinning said head on a vertical axis, the improvement comprising the following combination:

a pair of like hollow circular housing halves abutting in face-to-face relation to provide a cylindrical housing for said rotary head, said housing halves having co-axially apertured hubs, said apertures including polygonal internal wrench configurations;

a polygonal arbor opposite end portions of which snugly fit into said wrench configurations to prevent relative rotation between said housing halves, said arbor having threaded means of reduced diameter extending axially at its opposite ends through said co-axial apertures to receive upper and lower nut means for snugly assembling said housing halves on said arbor, said housing when so assembled, uniting to produce a co-axial cylindrical chamber having peripheral diametric window openings;

a spool for carrying peripherally thereon a reserve supply of cutting line and being freely rotatably confined within said chamber, free end portions of said line extending through said window openings, for cutting vegetation and producing a torque tending to rotate said spool to supplement the length of said free line end portions;

an indexer non-rotatably slideable on said arbor and spring biased into a given position;

escapement means including lock means on said spool and lug means on said indexer, said escapement means locking said spool against rotation when said indexer is in its spring biased given position and releasing said spool for rotation through a predetermined angle when said indexer is shifted axially on said arbor to a second position by inertia forces applied to said indexer through said handle while said head is spinning; and an annular packing means fitting in said chamber between one of said housing halves and said spool and replacing said indexer to produce an optional mode of operation in which control of feeding said line from said spool is effected exclusively manually, and while the tool is shut down, by loosening one of said arbor nut means, pulling said line ends desired amounts outwardly through said line windows, and then tightening said loosened arbor nut means.

2. In a flexible-line-whirling vegetation cutting hand tool, a rotary head for which is provided to be supported on and manipulated by a relatively long handle, equipped with power means for rapidly spinning said head on a vertical axis, the improvement comprising the following combination:

a pair of like hollow circular housing halves abutting in face-to-face relation to provide a cylindrical housing for said rotary head, said housing halves having co-axially apertured hubs, said apertures including polygonal internal wrench configurations;

a polygonal arbor opposite end portions of which snugly fit into said wrench configurations to prevent relative rotation between said housing halves, said arbor having threaded means of reduced diameter extending axially at its opposite ends through said co-axial apertures to receive upper and lower nut means for snugly assembling said housing halves on said arbor, said housing when so assembled, uniting to produce a co-axial cylindrical chamber having peripheral diametric window openings;

a spool for carrying peripherally thereon a reserve supply of cutting line and being freely rotatably confined within said chamber, free end portions of said line extending through said window openings, for cutting vegetation and producing a torque tending to rotate said spool to supplement the length of said free line end portions; and an annular packing means fitting in said chamber between one of said housing halves and said packing means frictionally locking said spool against rotation in said housing when both of said arbor nut means are tightened but releasing the spool when the tool is shut down and one of the arbor nut means is relaxed, permitting manual withdrawal of cutting line through said housing windows as desired, after which retightening of said nut means must precede resumption of the tool's operation.

* * * * *

UNITED STATES PATENT OFFICE
CERTIFICATE OF CORRECTION

Patent No. 4,195,408          Dated April 1, 1980

Inventor(s) Vincent A. Palmieri and John P. Palmieri

It is certified that error appears in the above-identified patent and that said Letters Patent are hereby corrected as shown below:

In the title page (item 76) the name of the first applicant should be corrected to read --Vincent A. Palmieri--

Colume 2, line 13, the word "resouding" should be corrected to read --resounding--

Column 3, line 4 the word "assemble" should be corrected to read --assembly--.

Column 7, line 23 "cuttinggportions" should be corrected to read --cutting portions--.

Column 7, line 57 the words "same described" should be corrected to read --same as described--.

Column 10, line 20 after "and" and before "said" (second occurrence) insert the words --said spool--.

Signed and Sealed this

*Fifteenth* Day of *July 1980*

[SEAL]

*Attest:*

SIDNEY A. DIAMOND

*Attesting Officer*     *Commissioner of Patents and Trademarks*